United States Patent
Aster

(10) Patent No.: US 10,070,276 B2
(45) Date of Patent: Sep. 4, 2018

(54) METHOD AND ARRANGEMENT FOR TRANSMITTING VOICE SIGNALS BETWEEN A CONTROLLER AND A TRANSPORT USER

(71) Applicant: FREQUENTIS AG, Vienna (AT)

(72) Inventor: Robert Aster, Vienna (AT)

(73) Assignee: Frequentis AG, Vienna (AT)

( * ) Notice: Subject to any disclaimer, the term of this patent is extended or adjusted under 35 U.S.C. 154(b) by 0 days.

(21) Appl. No.: 15/820,667

(22) Filed: Nov. 22, 2017

(65) Prior Publication Data

US 2018/0146345 A1 May 24, 2018

(30) Foreign Application Priority Data

Nov. 24, 2016 (AT) .............................. A 51065/2016

(51) Int. Cl.
  *H04B 7/00* (2006.01)
  *H04W 4/10* (2009.01)
  *H04B 7/185* (2006.01)

(52) U.S. Cl.
  CPC .......... *H04W 4/10* (2013.01); *H04B 7/18506* (2013.01)

(58) Field of Classification Search
  CPC ............................. H04W 4/10; H04B 7/18506
  See application file for complete search history.

(56) References Cited

U.S. PATENT DOCUMENTS

| | | | | |
|---|---|---|---|---|
| 3,904,969 | A * | 9/1975 | Eastmond | H03G 3/342 455/221 |
| 4,164,709 | A * | 8/1979 | Tudor | H04B 1/16 455/88 |
| 4,866,415 | A * | 9/1989 | Obayashi | H04B 1/00 340/384.5 |
| 5,153,579 | A * | 10/1992 | Fisch | G08B 3/1033 340/7.38 |
| 5,539,781 | A * | 7/1996 | Matsuura | H04B 7/084 375/347 |
| 6,167,033 | A * | 12/2000 | Chang | H04L 12/1827 370/241 |
| 6,208,848 | B1 * | 3/2001 | Bertrana | H03G 3/344 455/218 |
| 6,259,904 | B1 * | 7/2001 | Branner | H03G 3/344 455/174.1 |

(Continued)

*Primary Examiner* — Dominic Rego
(74) *Attorney, Agent, or Firm* — Laurence A. Greenberg; Werner H. Stemer; Ralph E. Locher

(57) ABSTRACT

A method performs radio communication between a controller and a transport user. A controller creates voice signals which are transmitted via a switching system to a transmitting antenna as a radio signal. The voice signals are received via a receiving antenna and are transmitted to the switching system. A squelch signal is created and indicates whether the signal applied to the receiving antenna contains voice messages. A component of the voice signal emitted by the controller and is received with a time delay, is removed from the received voice signal or is compensated for, and a corrected voice signal is determined. The corrected voice signal is transmitted to the controller, if the squelch signal is present, the signal which is emitted by the controller and does not reach the switching system with a time delay is superimposed on the corrected voice signal and the latter is transmitted to the controller.

8 Claims, 2 Drawing Sheets

(56) References Cited

U.S. PATENT DOCUMENTS

| | | | | |
|---|---|---|---|---|
| 7,043,286 B1* | 5/2006 | Leason | ............. | H04M 1/72569 |
| | | | | 455/417 |
| 2001/0005825 A1* | 6/2001 | Engelke | ............ | H04M 3/42391 |
| | | | | 704/235 |
| 2002/0197957 A1* | 12/2002 | Kawasaki | .............. | H03G 3/344 |
| | | | | 455/42 |
| 2013/0010622 A1* | 1/2013 | Horn | ................... | H04W 72/085 |
| | | | | 370/252 |
| 2013/0083931 A1* | 4/2013 | Higure | ................ | H04B 1/1638 |
| | | | | 381/56 |

* cited by examiner

METHOD AND ARRANGEMENT FOR TRANSMITTING VOICE SIGNALS BETWEEN A CONTROLLER AND A TRANSPORT USER

CROSS-REFERENCE TO RELATED APPLICATION

This application claims the benefit, under 35 U.S.C. § 119, of Austrian patent application A51065/2016, filed Nov. 24, 2016; the prior application is herewith incorporated by reference in its entirety.

BACKGROUND OF THE INVENTION

Field of the Invention

The invention relates to a method for transmitting voice signals between a controller and a transport user according to the precharacterizing clause of the main method patent claim. The invention also relates to an arrangement for communicating between a controller and a transport user according to the precharacterizing clause of main patent apparatus claim.

In air traffic control, controllers, for example air traffic controllers, communicate with the transport users assigned to them, in particular airplanes or aircraft, via voice communication.

FIG. 1 shows a schematic illustration of an arrangement for voice communication according to the prior art. The voice communication arrangement contains a controller workstation 5, which has at least one microphone 5a and a loudspeaker 5b, and a switching system 1 which is supplied with the voice signal SF from the controller which is recorded by the microphone 5a. The switching system 1 is connected to a transmitting antenna 2 and to a receiving antenna 3. The switching system 1 forwards the individual voice signals SF between the controller workstation 5 and the transmitting and receiving antennas 2, 3. The voice signals SF from the microphone 5a of the controller which are supplied to the switching system 1 are forwarded to a transmitting antenna 2 by the switching system 1. As soon as the controller actuates a push-to-talk button 5c on the controller workstation 5, a relevant transmission signal PTT is forwarded to the transmitting antenna 2 via the switching system 1. If a positive transmission signal PTT is present at the transmitting antenna 2, the voice signal SF is emitted by radio and, in particular, is also received by a user 4 in the transmission range of the transmitting antenna 2, for example an aircraft.

Voice signals from a user 4 are received by the receiving antenna 3 and are transmitted from the latter to the switching system 1 which in turn forwards voice signals AF received in this manner to the loudspeaker 5b of the controller. If the receiving antenna 3 determines that a voice signal AF is received via radio, it creates a squelch signal SQU which indicates this circumstance. The squelch signal SQU is forwarded to the switching system 1 and is forwarded from the latter to the controller workstation 5 and is visualized on a display 5d, for example by a control light.

In this context, it should be noted that voice signals SF from the controller himself which, once forwarded to the switching system 1 by the microphone 5a, are emitted by the transmitting antenna 2 are also usually received by the receiving antenna 3 and are fed back to the switching system 1 as received voice signals AF. The received voice signals AF are audible to the controller at the loudspeaker 5b.

It is important for the controller to receive a confirmation that a voice signal SF emitted by him is actually emitted. In the system illustrated in FIG. 1 and known from the prior art, such natural feedback already takes place as a result of the fact that each separate voice signal SF emitted via the transmitting antenna 2 is transmitted to the switching system 1 via the receiving antenna 3 and is again transmitted, as a received voice signal AF, to the loudspeaker 5a of the relevant controller and is audible to the latter.

Such an audible voice signal AF received by feedback of an emitted voice signal SF is usually referred to as true remote side tone. If a controller therefore hears the transmitted radio message as remote side tone in his loudspeaker 5b, he can assume that the radio message was actually emitted.

However, such return confirmation only functions satisfactorily if the propagation times of outgoing and incoming voice signals SF, AF through the switching system 1 via the transmitting and receiving antennas 2, 3 and the distance between the antennas of the emitted transmitting and receiving antennas 2, 3 are sufficiently short, wherein the signal propagation times in this case are shorter than approximately 20 milliseconds.

Whenever the received voice signal AF is perceived in a manner delayed by longer than approximately 20 milliseconds with respect to the voice signal SF emitted by the air traffic controller, the air traffic controller who emits the voice message SF perceives the received voice signal AF as an unpleasant echo which interferes with communication. In particular, such a longer signal delay can occur when emitted or received voice signals SF, AF are transmitted in a digitized and packetized form since precisely such a procedure contributes significantly to extending the signal propagation times, as a result of which signal propagation times which exceed 20 milliseconds are produced.

FIG. 2 shows a further procedure which is known from the prior art and attempts to avoid such an echo. This procedure differs from the known procedure illustrated in FIG. 1 in that the switching system 1 respectively forwards the voice signal SF generated by the microphone 5a directly back to the loudspeaker 5b when the receiving antenna 3 detects the mere presence of a received voice signal AF on account of the presence of a squelch signal SQU. As already mentioned, the receiving antenna 3 generates a squelch signal SQU according to procedures known from the prior art. In this case, the squelch signal created by the receiving antenna 3 controls a switch 13 which supplies the voice signal SF emitted by the controller via the microphone 5a directly to the loudspeaker 5b of the controller.

In the case of the prior art illustrated in FIG. 2, the switch 13 is advantageously controlled in such a manner that the voice signal SF emitted by the microphone 5a is switched through to the loudspeaker 5b only when a squelch signal SQU from the receiver 3 is present, on the one hand, and the controller presses the push-to-talk button 5c needed to emit voice signals SF, on the other hand.

Although this procedure eliminates the echo produced by the delay, it has the fundamental disadvantage that the controller is not able, while he himself is emitting voice signals SF, to receive incoming voice signals AF from transport users 4 since he only hears his own voice when speaking.

SUMMARY OF THE INVENTION

The object of the invention is to avoid the disadvantages mentioned above and to provide a voice transmission method and a voice switching system which does not have the disadvantages mentioned above. The invention achieves this object with the characterizing features of the main method patent claim.

The invention provides a method for radio communication between a controller and at least one transport user. The controller creates voice signals and the voice signals from the controller are transmitted via a switching system to a transmitting antenna and are emitted by the latter as a radio signal. The voice signals are received via a receiving antenna and are transmitted to the switching system. A squelch signal is created, which signal indicates whether the signal applied to the receiving antenna contains voice messages.

In this case, the invention provides for:
a) the component of the voice signal which is emitted by the controller and is received, in particular, with a time delay to be removed from the received voice signal or to be compensated for, and for a corrected voice signal to be determined in this manner, and
b) for the corrected voice signal to be transmitted to the controller, wherein, if a squelch signal is present, the signal which is emitted by the controller and does not reach the switching system with a time delay is superimposed on the corrected voice signal and the latter is transmitted back to the controller.

In order to make it possible to use simpler echo canceling methods and, at the same time, to be able to operate a multiplicity of receiving antennas which potentially each receive the signal emitted by the controller in a delayed manner, provision may be made for:
a) the voice signal emitted by the controller to be separately removed from the individual received voice signals for each antenna or to be compensated for, and for corrected voice signals to be created in this manner, and
b) for the signals emitted by the controller to be superimposed on individual or all corrected voice signals and/or for the latter to be transmitted to the controller if at least one of the squelch signals from the receiving antennas is active.

For advantageous voice communication, provision may be additionally made for:
a) the transmitting antenna to emit the voice signal from the controller only when a push-to-talk button is pressed, and
b) for the voice signal emitted by the controller to be transmitted back to the controller and to have the corrected voice signal superimposed on it for this purpose only when the push-to-talk button has been pressed and/or to be suppressed when the push-to-talk button has not been pressed.

One preferred embodiment of the invention may also provide for the echo compensation unit to be active only when a squelch signal is present. The echo compensation unit therefore does not need to operate continuously, but rather only precisely when precisely a radio message is received by the receiving antenna.

The invention also relates to a radio communication arrangements.

Such a radio communication arrangement according to the invention contains at least one controller workstation having a microphone and a loudspeaker, a transmitting antenna and a receiving antenna, and a switching system which is connected to the controller workstation and to the transmitting antenna and the receiving antenna. The switching system forwards voice signals created by the controller for radio transmission to the transmitting antenna. The switching system forwards voice signals received by the receiving antenna to the controller workstation. The receiving antenna and/or the switching system is/are designed to generate a squelch signal which indicates whether the signal applied to the receiving antenna contains voice messages.

The invention provides for:
a) the switching system to contain an echo compensation unit which is configured to remove the component of the voice signal which is emitted by the controller and is received, in particular, with a time delay from the received voice signal or to compensate for it and to create a corrected voice signal in this manner,
b) for the switching system to contain a switch, to the input of which the voice signal emitted by the controller is supplied and which is designed to forward the voice signals emitted by the controller workstation to its output when a squelch signal is present and to suppress the voice signals if a squelch signal is absent, and
c) for the switching system to have a mixer which is connected downstream of the echo compensation unit and the switch and is configured to superimpose the signals applied to the output of the echo compensation unit and of the switch and to keep a superimposition signal created by such superimposition available at its output, wherein the output of the mixer is connected to the loudspeaker of the controller workstation.

In order to make it possible to use simpler echo canceling methods and, at the same time, to be able to operate a multiplicity of receiving antennas which potentially receive the signal emitted by the controller in a delayed manner, provision may be made for:
a) an echo compensation unit to be respectively separately provided for each receiving antenna and to separately remove the voice signal emitted by the controller from the respectively received voice signal from the respective receiving antenna or to compensate for it and in this manner to create a corrected voice signal, and
b) for the switch to be controlled in such a manner that it forwards the voice signal emitted by the controller workstation to its output if at least one of the squelch signals from the receiving antennas is present.

For advantageous voice communication, provision may be additionally made:
a) for the controller workstation to contain a push-to-talk button, the transmission signal from which is forwarded to the switching system and to the transmitting antenna,
b) for the transmitting antenna to emit the voice signal from the controller only when the transmission signal indicates that the push-to-talk button is pressed, and
c) for the switch to be configured to forward the voice signals emitted by the controller workstation and applied to the input of the switch to its output if a squelch signal is present, on the one hand, and the transmission signal indicates that the push-to-talk button is pressed, on the other hand.

One preferred embodiment of the invention may also provide for the echo compensation unit to be active only when a squelch signal from the receiving antenna indicates that precisely a radio message is received by the receiving antenna. The echo compensation unit therefore does not need to operate continuously, but rather only precisely when precisely a radio message is received by the receiving antenna.

Other features which are considered as characteristic for the invention are set forth in the appended claims.

Although the invention is illustrated and described herein as embodied in a method and an arrangement for transmitting voice signals between a controller and a transport user, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
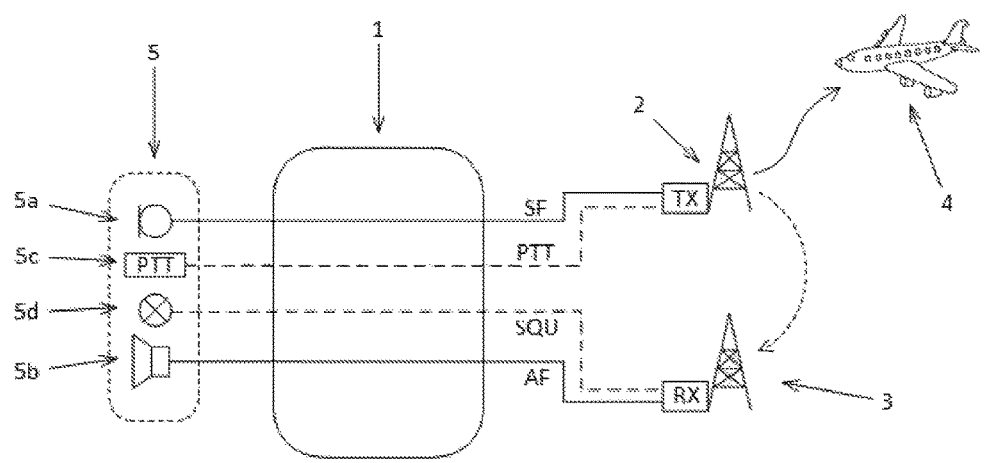
FIG. 1 is an illustration of an arrangement of a first embodiment for voice communication according to the prior art.
Figure 2:
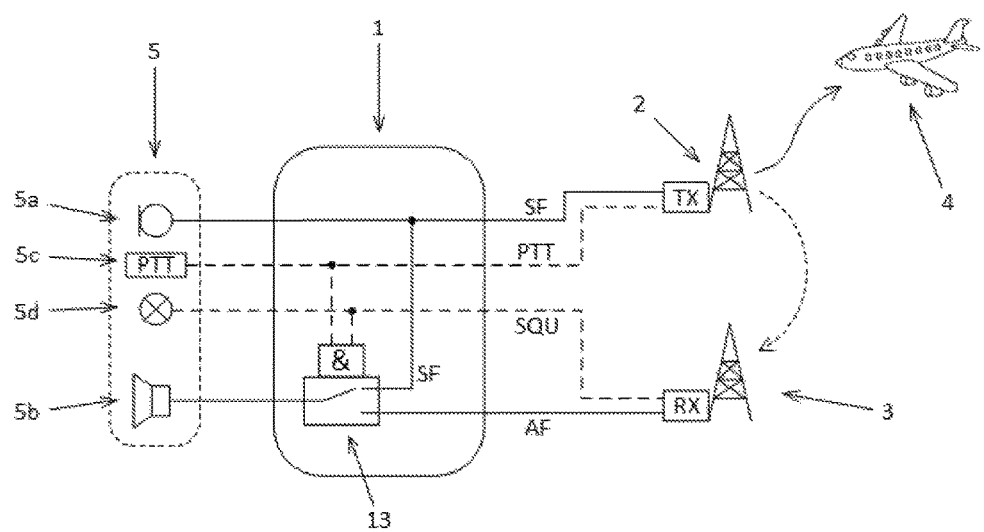
FIG. 2 is an illustration of an arrangement of a second embodiment for voice communication according to the prior art.
Figure 3:
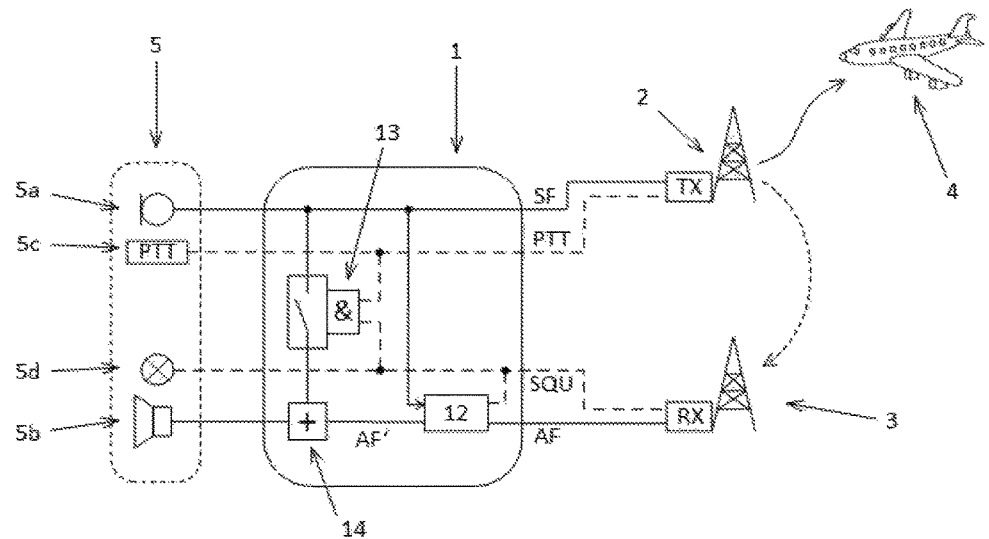
FIG. 3 is an illustration of an arrangement of a third embodiment for voice communication according to the invention.
Figure 4:
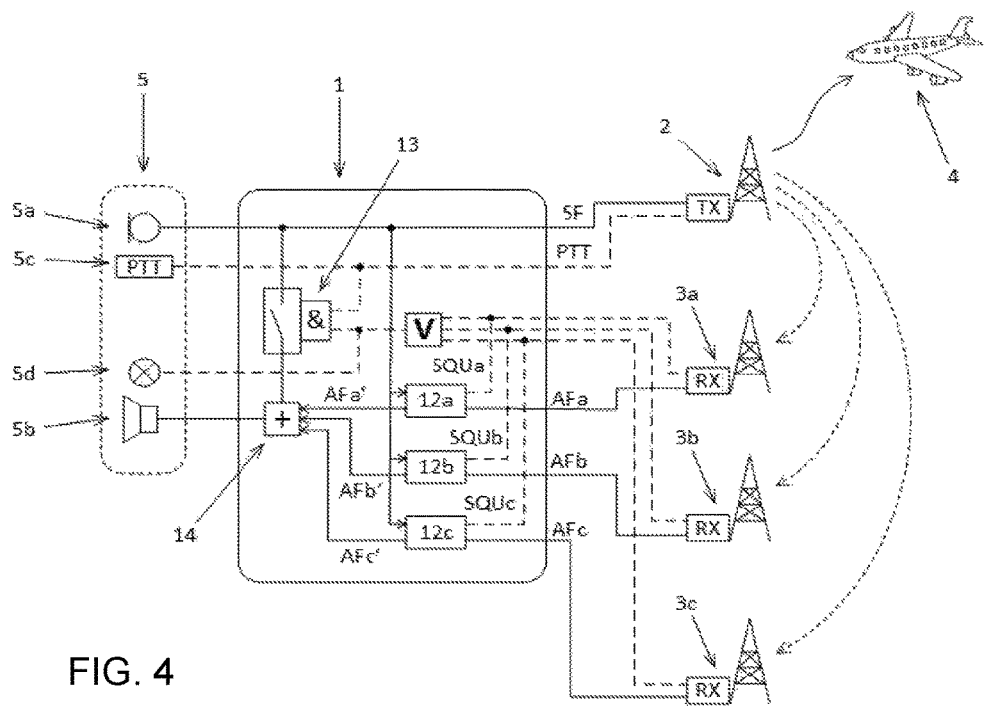
FIG. 4 is an illustration of an arrangement of a fourth embodiment for voice communication according to the invention.

Two preferred embodiments of the invention are described in more detail on the basis of the further figures of the drawing. FIG. 3 schematically shows a first embodiment of the invention with only a single receiving antenna. FIG. 4 shows a second embodiment of the invention having a plurality of receiving antennas.

Referring now to the figures of the drawings in detail and first, particularly to FIG. 3 thereof, there is shown the first embodiment of the invention which contains a controller workstation 5, a switching system 1 and a transmitting antenna 2 and a receiving antenna 3.

Embodiments according to the invention typically have a multiplicity of controller workstations 5, wherein only a single controller workstation 5 is illustrated by way of example in FIG. 3. The controller workstation 5 contains a microphone 5a and a loudspeaker 5b which are advantageously in the form of a headset. In addition, the controller workstation 5 also has a push-to-talk button 5c and a squelch display 5d. The push-to-talk button 5c is used to control the transmitting antenna 2 so as to emit the voice signals SF from the controller which are recorded by the microphone 5a. The squelch display 5d provides the controller with information relating to whether precisely a voice signal AF has been received via the receiving antenna 3. All components of the controller workstation 5 are connected to the switching system 1.

In the present exemplary embodiment of the invention, the switching system 1 contains a switch 13, to the input of which the voice signal SF from the microphone 5a of the controller workstation 5 is directly supplied. The switch 13 is closed when the push-to-talk button 5c of the controller workstation 5 is pressed. In addition, as illustrated in FIG. 3, provision may preferably be made for the switch 13 to also be closed only when the squelch signal SQU from the receiving antenna 3 additionally indicates that precisely a radio message is received by the receiving antenna 3.

The switching system 1 also contains an echo compensation unit 12 which is supplied with the voice signals AF received by the receiving antenna 3 and the squelch signal SQU. The voice signals SF emitted by the controller are supplied to the echo compensation unit 12 as reference signals. The echo compensation unit 12 has the task of compensating for components of voice signals AF which have been emitted by the controller and are received in a delayed manner in the voice signal AF from the receiving antenna 3 and to hold a voice signal AF' compensated for in this manner at its output. Although it would be possible, in principle, to allow the echo compensation unit 12 to operate continuously, the echo compensation unit 12 does not need to be active as long as no radio message is received by the receiving antenna 3. It is therefore preferably controlled in such a manner that it becomes active only if a squelch signal SQU is present.

The signal applied to the output of the switch 13 is superimposed on the compensated voice signal AF' applied to the output of the echo compensation unit 12 in a superimposition unit 14 (also referred to as a mixer 14 below). A superimposition signal is applied to the output of the superimposition unit 14 and is transmitted to the loudspeaker 5b of the controller workstation 5. The squelch signal SQU from the antenna 3 is forwarded to the display 5d of the controller workstation 5.

This specific procedure means that the controller perceives the voice signals SF emitted by him without a significant time delay and in this manner can understand that the voice signals SF emitted by him have been emitted by radio. There is also the advantage that the controller can also perceive arriving voice signals AF while he himself is speaking or is emitting voice signals SF.

The second embodiment of the invention illustrated in FIG. 4 differs from the embodiment of the invention illustrated in FIG. 3 in that, instead of one receiving unit, there are a plurality of receiving units 3a, 3b, 3c. Each individual receiving unit 3a, 3b, 3c emits a separate received voice signal AFa, AFb, AFc and a separate squelch signal SQUa, SQUb, SQUc.

Instead of the one squelch signal, a signal which is created by ORing all squelch signals SQUa, SQUb, SQUc is used to control the switch 13. As a result, it suffices for a squelch signal SQUa, SQUb, SQUc from only a single receiving antenna 3a, 3b, 3c to be present in order to cause the local forwarding of voice signals SF from the controller back to the controller. Provision may again be made for such local forwarding of the voice signal from the controller back to the controller to take place only when the push-to-talk button 5c of the relevant controller is pressed at the same time.

In the case of a multiplicity of receiving antennas 3a, 3b, 3c, the signals are each corrected separately by means of echo canceling using a separate echo compensation unit 12a, 12b, 12c. The present switching system 1 contains a total of three echo compensation units 12a, 12b, 12c, each of which is supplied with the received voice signal AFa, AFb, AFc from a respective receiving antenna together with the associated squelch signal SQUa, SQUb, SQUc and the voice signal SF emitted by the microphone 5a as a reference signal. The relevant echo-corrected signals AFa', AFb', AFc' and the signal applied to the output of the switch 13 are supplied to a mixer 14. The output of the mixer 14 is connected to the loudspeaker 5b of the controller workstation 5.

If a controller now forwards a voice signal SF to the switching system 1 via the controller workstation 5 or the microphone 5a and simultaneously presses the push-to-talk button 5c, the switching system 1 forwards the voice message SF to the transmitting antenna 2 which emits a radio signal corresponding to the voice signal SF. In addition, another communication user 4 may simultaneously emit a voice signal which is received by the receiving antenna 3 or by one or more receiving antennas 3*a*, 3*b*, 3*c*. The receiving antennas 3*a*, 3*b*, 3*c* accordingly each forward a received voice signal AFa, AFb, AFc to the switching unit 1. Furthermore, the receiving antennas 3*a*, 3*b*, 3*c* each forward a squelch signal SQUa, SQUb, SQUc to the switching system 1.

The received voice signals AFa, AFb, AFc now contain the voice of the controller and the voice of another transport user 4 in superimposed form. Since the voice signals AFa, AFb, AFc obtained in this manner have been supplied to the respective echo compensation units 12*a*, 12*b*, 12*c*, echo-corrected reception signals AFa', AFb', AFc', in which only the voice of the further transport user 4 can be heard, whereas the time-delayed voice of the controller has been removed by means of echo compensation, are respectively obtained at the output of the respective echo compensation units 12*a*, 12*b*, 12*c*.

Since at least one of the squelch signals SQUa, SQUb, SQUc is also active, the switch 13 is connected, with the result that a voice signal which contains the non-time-delayed voice signal SF from the controller is applied to the output of the switch 13. The signal applied to the output of the switch 13 and the echo-corrected reception signals AFa', AFb', AFc' applied to the output of the echo compensation units 12*a*, 12*b*, 12*c* are then forwarded to the mixer 14 and are superimposed by the latter to form a common signal and are forwarded to the loudspeaker 5*b* of the controller workstation 5.

The controller finally perceives his own voice on the loudspeaker 5*b* without a time delay and simultaneously hears voice signals which arrive at him from other communication users 4.

The invention claimed is:

1. A method for radio communication between a controller and at least one transport user, which comprises the steps of:
    creating, via a controller, voice signals;
    transmitting the voice signals from the controller via a switching system to a transmitting antenna to be emitted as a radio signal;
    receiving the voice signals via a receiving antenna;
    transmitting the voice signals to the switching system;
    creating a squelch signal which indicates whether a signal applied to the receiving antenna contains voice messages;
    removing a component of a voice signal which is emitted by the controller and is received, with a time delay, from a received voice signal or is compensated for, and a corrected voice signal is determined; and
    transmitting the corrected voice signal to the controller, wherein, if the squelch signal is present, the voice signal which is emitted by the controller and does not reach the switching system with the time delay is superimposed on the corrected voice signal and a superimposed voice signal is transmitted back to the controller.

2. The method according to claim 1, which further comprises:
    providing the switching system with a plurality of receiving antennas;
    separately removing the voice signal emitted by the controller from the voice signals individually received for each of the receiving antennas or is compensated for, and corrected voice signals are created; and
    superimposing the voice signals emitted by the controller on one or all of the corrected voice signals and/or the corrected voice signals are transmitted to the controller if at least one of said squelch signal from the receiving antennas is active.

3. The method according to claim 1, which further comprises:
    emitting via the transmitting antenna the voice signal from the controller only when a push-to-talk button is pressed; and
    transmitting the voice signal emitted by the controller back to the controller which has the corrected voice signal superimposed on it for this purpose only when the push-to-talk button has been pressed and/or is suppressed when the push-to-talk button has not been pressed.

4. The method according to claim 1, which further comprises activating an echo compensation unit only when the squelch signal is present.

5. A configuration for radio communication between a controller and at least one transport user, the configuration comprising:
    at least one controller workstation having a microphone and a loudspeaker;
    a transmitting antenna;
    a receiving antenna;
    a switching system connected to said controller workstation, to said transmitting antenna and to said receiving antenna, said switching system forwarding voice signals created by said controller workstation for radio transmission to said transmitting antenna, said switching system forwarding the voice signals received by said receiving antenna to said controller workstation;
    at least one of said receiving antenna or said switching system is configured to generate a squelch signal for indicating whether a signal applied to said receiving antenna contains voice messages;
    said switching system having an echo compensation unit configured to remove a component of a voice signal emitted by said controller workstation and received with a time delay from a received voice signal or to compensate for the component and to create a corrected voice signal, said switching system containing a switch, to an input of said switch the voice signal emitted by said controller workstation is supplied, said switching system configured to forward the voice signals emitted by said controller workstation to a switch output when the squelch signal is present and to suppress the voice signals if the squelch signal is absent; and
    said switching system having a mixer connected downstream of said echo compensation unit and said switch, said mixer configured to superimpose signals applied to an output of said echo compensation unit and of said switch and to keep a superimposition signal created by such superimposition available at an output of said mixer, wherein said output of said mixer is connected to said loudspeaker of said controller workstation.

6. The configuration according to claim 5, wherein:
    said receiving antenna is one of a plurality of receiving antennas;
    said echo compensation unit is one of a plurality of compensation units and one of said compensation units is separately provided for each of said receiving antennas and separately removes the voice signal emitted by said controller workstation from a respectively received voice signal from a respective one of said receiving antennas or compensates for it and creates a corrected voice signal; and said switch is controlled in such a manner that said switch forwards the voice signal emitted by said controller workstation to said switch output if at least one said squelch signal from said receiving antennas is present.

7. The configuration according to claim 5, wherein:

said controller workstation contains a push-to-talk button, a transmission signal from said controller workstation is forwarded to said switching system and to said transmitting antenna;

said transmitting antenna emits the voice signal from said controller workstation only when the transmission signal indicates that said push-to-talk button is pressed; and said switch forwards the voice signals emitted by said controller workstation and applied to said input of said switch to said switch output if the squelch signal is present, and the transmission signal indicates that said push-to-talk button is pressed.

8. The configuration according to claim 5, wherein said echo compensation unit is active only when the squelch signal from said receiving antenna indicates that precisely a radio message is received by said receiving antenna.

* * * * *